United States Patent
Bala et al.

[11] Patent Number: 6,075,631
[45] Date of Patent: Jun. 13, 2000

[54] HITLESS RECONFIGURATION OF A WAVELENGTH DIVISION MULTIPLEXED OPTICAL COMMUNICATION NETWORK

[75] Inventors: Krishna Bala, New York, N.Y.; Gee-Kung Chang, Holmdel, N.J.; Georgios Nicos Ellinas, New York, N.Y.; Michael Post, Holmdel, N.J.; Chien-Chung Shen, Keansburg, N.J.; John Yee-Keung Wei, Aberdeen, N.J.

[73] Assignee: Bell Communications Research, Inc., Morristown, N.J.

[21] Appl. No.: 08/926,332

[22] Filed: Sep. 5, 1997

[51] Int. Cl.[7] .................................................. H04J 14/00
[52] U.S. Cl. ........................ 359/124; 359/125; 359/118; 359/164
[58] Field of Search .................................... 359/115, 118, 359/119, 120, 121, 124, 125, 128, 164, 165; 370/254, 255; 385/24

[56] References Cited

U.S. PATENT DOCUMENTS

| | | | |
|---|---|---|---|
| 5,414,451 | 5/1995 | Patel et al. | 359/39 |
| 5,414,540 | 5/1995 | Patel et al. | 359/39 |
| 5,436,748 | 7/1995 | Urnel et al. | 359/125 |
| 5,760,934 | 6/1998 | Sutter et al. | 359/125 |
| 5,764,392 | 6/1998 | Van As et al. | 359/124 |
| 5,771,111 | 7/1998 | Domon et al. | 359/125 |
| 5,774,244 | 7/1998 | Tandon et al. | 359/125 |

OTHER PUBLICATIONS

Papadimitriou et al., *Combinatorial Optimization: Algorithms and Complexity* (Prentice Hall, 1982), pp. 218–224, 247–255.

Lee et al., "A wavelength convertible optical network," *IEEE/OSA Journal of Lightwave Technology*, vol. 11, 1993, pp. 962–970.

Ramaswami et al, "Routing and wavelength assignment in all–optical newtorks," *IEEE/ACM Transactions on Networking*, vol. 3, 1993, pp. 489–500.

Brackett et al., "A scalable multiwavelength multihop optical network: a proposal for research on all–optical networks," *Journal of Lightwave Technology*, vol. 11, pp. 736–753, 1993.

Patel et al., "Liquid Crystal and Grating–Based Multiple–Wavelength Cross–Connect Switch," *IEEE Photonics Technology Letters*, vol. 7, 1995, pp. 514–516.

Bala et al., "Routing in a Linear Lightwave Network," *IEEE/ACM Transactions on Networking*, vol. 3, No. 4, 1995, pp. 459–469.

Bala et al., "Optical Wavelength Routing, Translation, and Packet/Cell Switched Networks," *Journal of Lightwave Technology*, vol. 14, No. 3, 1996, pp. 336–343.

*Primary Examiner*—Rafael Bacares
*Attorney, Agent, or Firm*—Joseph Giordano; David A. Hey; Loria B. Yeadon

[57] ABSTRACT

A method of reconfiguring a multi-wavelength communication network. The transition includes determining the union of the old and new topologies. During at least the start of the transition, the network supports the union topology. New connections are connected according to the new topology, and the old topology, as its connections expire, is gradually removed. In allocating wavelengths to a new topology, two algorithms are developed which assign wavelengths which do not color clash with the wavelength assignments of the old topology.

16 Claims, 9 Drawing Sheets

HITLESS RECONFIGURATION OF A WAVELENGTH DIVISION MULTIPLEXED OPTICAL COMMUNICATION NETWORK

GOVERNMENT INTEREST

This invention was made under government contract MDA972-95-3-0027 awarded by the Advanced Research Projects Agency.

FIELD OF THE INVENTION

The invention relates to communication networks. In particular, the invention relates to reconfigurable wavelength-division multiplexed optical networks between different configurations or topologies reflecting different traffic demands.

BACKGROUND ART

Communication networks are increasingly relying upon optical fiber as the transmission medium. Originally optical fiber was used as a point-to-point substitute for electrical transmission line, such as coaxial cable. An electrical data signal at the transmitting end of the fiber was used to modulate an optical source such as a laser emitting at a wavelength at which the fiber is substantially transparent. The optical fiber carries the modulated optical signal from the transmitting end to the receiving end. The receiver includes an optical detector which demodulates the optical signal to produce an electrical signal equivalent to the electrical data signal at the transmitting end. One disadvantage of this architecture is that while the bandwidth of silica optical fiber is measured in hundreds of terahertz ($\sim 10^{14}$ Hz), the system throughput is limited to the speeds of the electronic transmitters and receivers, currently approaching 10 Gb/s ($10^{10}$ bits per second).

It was early realized that with proper components wavelength-division multiplexing (WDM) could multiply the throughput of an optical fiber. In WDM, at the transmitting end of the fiber, different data signals modulate optical sources emitting at different wavelengths. The multiple optical signals are multiplexed onto a single fiber. At the receiving end, the optical signals are demultiplexed into separate optical paths, and the separated optical signals are then individually detected. While WDM does multiply the fiber throughput by the number W of WDM channels, as described thus far, the architecture is still point-to-point. As a result, expensive opto-electronic converters as well as optical multiplexers and demultiplexers are needed at each node of the network, and these converters are very expensive and their designs are dependent upon data rate and signal format.

More recently, all-optical communication networks have been proposed that rely upon WDM and wavelength-selective switching. See for example Brackett et al., "A scalable multiwavelength multihop optical network: a proposal for research on all-optical networks," *Journal of Lightwave Technology*, vol. 11, pp. 736–753, 1993. One such all-optical network 10 is illustrated in the network diagram of FIG. 1. It includes four wavelength-selective cross-connects $12_1$, $12_2$, $12_3$, $12_4$ interlinked by unidirectional fiber cross-links $14_1$, $14_2$, $14_3$, $14_4$, $14_5$, $14_6$. In practice, the unidirectional links are almost always paired to produce a bidirectional link. However, the illustration is restricted for clarity to only a few unidirectional links. The all-optical network 10 interconnects multiple switch nodes $16_1$, $16_2$, $16_3$, $16_4$, $16_5$, which will be assumed to include W×W ATM switches, where W is the number of WDM channels. Unidirectional fiber in-links $18_1$, $18_2$, $18_3$, $18_4$, $18_5$ and unidirectional fiber out-links $20_1$, $20_2$, $20_3$, $20_4$, $20_5$ connect the cross-connects $12_1$, $12_2$, $12_3$, $12_4$ within the all-optical network 10 to the switch nodes $16_1$, $16_2$, $16_3$, $16_4$, $16_5$. An ATM switch is one conforming to the well known telephony standard of Asynchronous Transfer Mode.

A representative switch node 16 is schematically illustrated in FIG. 2. A fiber in-link 18 carrying up to W-WDM signals from the all-optical network 10 inputs to an optical demultiplexer 22 which separates the WDM signals into W separate paths. A detector array 24 has W detectors separately detecting the signals and producing corresponding electrical signals. A switch 26, here assumed to be W×W ATM switch, receives the electrical lines from the detector array 24 on electrical input ports 28. A complementary structure exists on the transmission side. A modulator array 32 of lasers receives W electrical signals from output ports 30 of the ATM switch 26 and converts those signals to optical signals on W optical links 33 having differing carrier wavelengths, and outputs the W optical signals to an optical multiplexer 34 which combines them to a single physical communication path. A fiber in-link 20 receives from the multiplexer 34 the multiplexed optical signals, that is, the WDM signal, and transmits it into the all-optical network 10. The ATM switch 26 is also connected by electrical add/drop lines to one, two, or more users 36, each of which may be a central office switch or other large user of bandwidth which further demultiplexes the signals for smaller users.

All of the fiber links discussed this far are assumed to be capable of carrying up to WWDM signals. An advantage of the all-optical network 10 is that, once a WDM signal is transmitted therein, it is routed according to the wavelength of the optical carrier wave. That is, a WDM wavelength channel is set up between a transmitting terminal and a receiving terminal, and a complex web of such wavelength channels may interconnect three or more terminals. An example of such an interconnection is illustrated in FIG. 3. Switching node $16_1$ transmits to switching node $16_4$ over WDM path $40_1$ while it transmits to switching node $16_2$ over WDM path $40_2$. The WDM path $40_1$ includes the out-link $20_1$ (FIG. 1), the cross-connect $12_2$, the cross-link $14_2$ (FIG. 1), the cross-connect $12_4$, and the in-link $18_4$ (FIG. 1) while the WDM path $40_2$ includes the out-link $20_1$ (FIG. 1), the cross-connect $12_2$, and the in-link $18_2$ (FIG. 1). That is, the out-link $20_1$, carries both WDM paths $40_1$, $40_2$, but it is able to do this because the two WDM paths $40_1$, $40_2$ are assigned to different carrier wavelengths, and the wavelength-selective cross-connect $12_2$ directs the two wavelength-differentiated signals to the proper receiving node. Similarly, switching nodes $16_2$, $16_3$ establish bidirectional communication over WDM paths $42_1$, $42_2$. The WDM path $42_1$ extends over out-link $20_2$ (FIG. 1), cross-connect $12_2$, cross-link $14_5$ (FIG. 1), cross-connect $12_3$, and in-link $18_3$ (FIG. 1) while the WDM path $42_2$ extends over out-link $20_3$ (FIG. 1), cross-connect $12_3$, cross-link $14_4$ (FIG. 1), cross-connect $12_2$ and in-link $18_2$ (FIG. 1). This example importantly shows that the in-link $18_2$ is carrying two WDM signals from two different switch nodes $16_1$, $16_3$ over the WDM paths $40_2$, $42_2$. This can be accomplished only if the two WDM paths $40_2$, $42_2$ are assigned to different WDM wavelengths. That is, the network must be configured so that multiple WDM signals do not interfere on any link. Expressed differently, colors (wavelengths) cannot clash on any link.

The all-optical network 10 described above is best characterized as a mesh network. Other popular WDM network architectures include star networks and ring networks. The color clash problem addressed by the invention exists in all of these, and the solution presented by the invention can be applied to them all with minor modifications.

The operation of the all-optical network 10 depends on the cross-connects $12_1$, $12_2$, $12_3$, $12_4$ being able to switch signals among different outputs dependent upon the optical carrier wavelength of those signals. Such cross-connects are available in at least three different technologies. All these technologies advantageously allow the cross-connects to be reconfigured so as to, at different times, send signals of the same wavelength in different directions.

A first technology involves a hybrid WDM switch, such as described by Iqbal et al. in "High Performance Optical Switches For Multiwavelength Rearrangeable Optical Networks," *Government Microelectronic Circuits Application Conference* (GOMAC) '94, San Diego, Calif., Nov. 1994, 3 pp. This 4-wavelength 2×2 switch includes cascaded multilayer thin-film interference filters and discrete 2×2 cross-bar, relay-actuated optical switches connected to the outside with optical multiplexers and demultiplexers. The hybrid, fiber-based, WDM switch demultiplexes the input wavelengths to different 2×2 optical switches, and the mechanically switched signals are recombined (multiplexed) at the output. The relay-actuated opto-mechanical switches are mechanical switches in which fibers connected to the two inputs are mechanically moved into alignment with different output fibers. Although this technology is conceptually relatively unsophisticated, its subsecond switching speed is satisfactory for many envisioned architectures, it offers the assurance and reliability of a mechanical part, and is currently commercially available from JDS Fitel.

The second technology involves acousto-optical tunable filters (AOTFs), usually formed in a $LiNbO_3$ substrate, in which the optical frequencies selected for switching are related to RF frequencies impressed on an interdigitated electrode formed over an optical waveguide in the piezo-electric $LiNbO_3$ substrate, causing the selected signal to change its polarization state and thus to be switched by a polarization coupler. Such AOTFs are described by Cheung et al. in U.S. Pat. No. 5,002,349.

A third technology involves liquid-crystal switches, as described by Patel et al. in U.S. Pat. Nos. 5,414,540 and 5,414,541 and in "Liquid Crystal and Grating-Based Multiple-Wavelength Cross-Connect Switch," *IEEE Photonics Technology Letters*, vol. 7, 1995, pp. 514–516. By means of wavelength-dispersive layers and segmented liquid-crystal polarization-rotation layers, the different WDM channels can be switched in different directions.

It is anticipated that not all pairs of ATM-based switching terminals will always be interconnected by dedicated WDM paths. Dedicated WDM paths can be changed to single-hop connections if traffic is low or configuration problems prevent a direct WDM connection. Furthermore, a multi-hop connection can be formed for paths anticipated to carry little traffic. For example, as illustrated in FIG. 3, the ATM switch at node $16_3$ can transmit to the ATM switch at node $16_1$ through the ATM switch at node $16_2$, which after redirecting the ATM cell back onto the network 10 most likely wavelength converts the data signal for retransmission.

These considerations and the fact that substantial excess capacity will be available indicate that the reconfiguration problem can be best viewed as a topological problem of interconnecting the switching nodes. For example, as shown in FIG. 4, switching node $50_1$ has a transmitting link to switching node $50_3$; switching nodes $50_2$, $50_3$ are interconnected by anti-parallel links; and switching node $50_4$ has respective transmitting links to switching nodes $50_1$, $50_3$. This topological configuration $T_1$ may reflect a daily traffic pattern, such as a network interconnecting financial institutions which, in the morning, have relatively heavy traffic. However, in the early afternoon, traffic subsides, and the topology $T_2$ shown in FIG. 4 may be sufficient. Later in the evening, the traffic changes as the institutions exchange data and backup for the day's transactions. For this traffic, topology $T_3$ illustrated in FIG. 4 may be optimal. At some time before the next morning's rush, the topology needs to change back to $T_1$.

The concept of links needs to be separated from the call connections carried on those links. A call connection whether for voice, data, or video is anticipated to be of limited duration as determined by the nature of the call, a duration generally less than the time that a traffic topology is in place. After completion of the call, the call connection is terminated. However, in rearranging links, if a call connection is terminated on a link before the natural end of the call connection, the call is likely to experience loss of data, here called a hit. Even if the call connection is rerouted to another link, data may be lost during the link reconfiguration. It is assumed that the network control algorithm has no specific information about the intended duration of existing calls at the time a change of topology is desired.

Consistent with the switching speeds available in the different technologies available for wavelength-selective interconnects, it is anticipated that the switching configurations of the cross-connects be established for times that are much longer than the length of the electrical packet used for communication between the electrical switches. In the case of the switches being ATM switches, the length of the ATM cell is 125 $\mu s$. Indeed, the configuration of the presently envisioned all-optical network is expected to change only on time periods of the order of hours. It is expected that the distribution of traffic density around the network changes sufficiently several times a day, as described immediately above, to justify reconfiguring the interconnects. A related time constraint involves the relative duration of the reconfiguration process compared to the duration of the traffic patterns prompting the reconfigurations. In order to simplify the problem to a single transition for the most part, it will be assumed that the time required to transition from the topological configuration $T_i$ to a new configuration $T_{i+1}$ is shorter than the period over which the traffic pattern changes sufficiently to warrant a yet further configuration $T_{i+2}$. This assumption does not rigorously follow from traffic patterns in a realistic network, but extra means will be incorporated to avoid problems associated with violations of the assumption.

However, reconfiguring operating networks introduces several difficulties. First, it is not desirable to break all existing call connections before the reconfiguration and to reestablish them on the reconfigured network. Although ATM cells for one connection can be routed along different paths, the cells can arrive out of order if the path has been reconfigured. Voice messages would be garbled during such a changeover.

A second problem in reconfiguring operating networks is that if the existing connections are broken before the reconfiguration process and then re-established after the reconfiguration, information will likely be lost. Any such loss will produce gaps in the voice, video, or data transmitted over the network to the users, an obviously undesirable characteristic of the network, particularly for data. The loss of cells or their garbling is referred to as a hit in the narrow sense. It is desirable to reconfigure a network with a minimum, preferably zero, of hits. In the broad sense, a hit occurs when a call connection needs to rerouted during network reconfiguration because the former link connection is disappearing.

Although the three network configurations described above for financial institutions are straightforward and amenable to manual determination, real-life networks are subject to more variables, such as week-ends, end of quarter, national holidays, local holidays, special events, emergencies, etc. Determining the proper network configurations for all these situations is a process that is preferably automated, and the transitions between such a large number of configurations need to be automated.

SUMMARY OF THE INVENTION

The invention can be summarized as a method of reconfiguring a multi-channel communications network, particularly a wavelength-division multiplexing network relying upon wavelength for routing within the network. The topology of connections between nodes of the network are periodically changed to reflect changing traffic patterns or other reasons. To effect a transition between two topologies, the union is formed of the former topology and the new topology, and the network in transition is configured with the union topology with the necessary number of wavelengths for the union. Once in transition, all new call connections are assigned to the new topology. Terminating call connections on the former topology are disconnected at their natural expiration, and, when the last call connection on an old link is terminated, that link is removed from service. Thereby, the union topology gradually transitions to the new topology.

Two algorithms are available to assign wavelengths to the new topologies consistent with wavelength assignments of the prior topology. In a dynamic algorithm, at each transition, unused wavelengths are sequentially assigned to links of the new topology. If no more wavelengths are available, a new wavelength is assigned to the wavelength pool. In a static algorithm applicable to an iterative cycle of network configurations, the dynamic algorithm is used except at the transition to the last topology of the cycle. At that transition, the wavelengths assigned to the last topology are chosen which conflict neither with the second last topology nor with the first topology of the cycle. Thereby, the wavelength assignments repeat upon iterative executions of the cycle.

DESCRIPTION OF THE PREFERRED EMBODIMENTS

Figure 4:
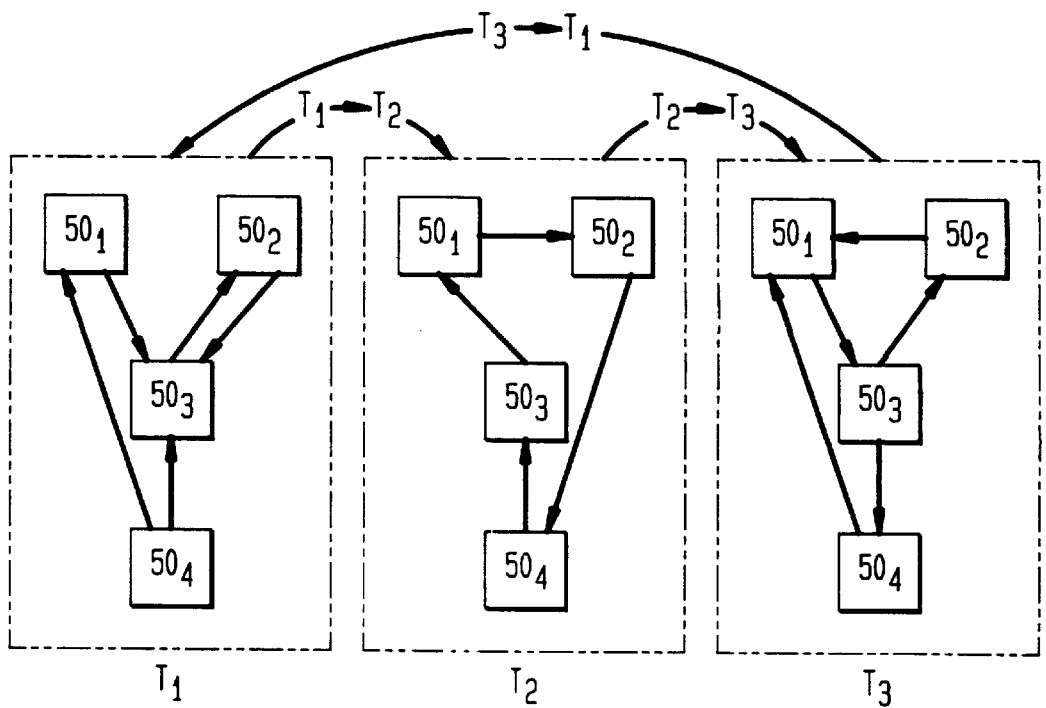
FIG. 4 are a series of exemplary network configuration topologies.

Three exemplary topological configurations $T_1, T_2, T_3$ are illustrated in FIG. 4, in which a changing set of illustrated unidirectional interconnects link four switching nodes $50_1$, $50_2$, $50_3$, $50_4$. These configurations $T_1, T_2, T_3$ will be referred to as steady-state configurations as being the desired configurations for a particular time period without regards to how the steady-state condition is achieved. It is assumed that the steady-state configurations $T_1, T_2, T_3$ are cyclic so that configuration $T_3$ is followed by $T_1$. The configurations are meant to be illustrative only and do not necessarily represent a realistic network. The illustrated topologies do not explicitly include the intermediate wavelength-selective interconnects $12_1, 12_2, 12_3, 12_4$ of the all-optical network of FIG. 1. Indeed, much of the following discussion is applicable to a wider class of networks than WDM communication networks.

Figure 1:
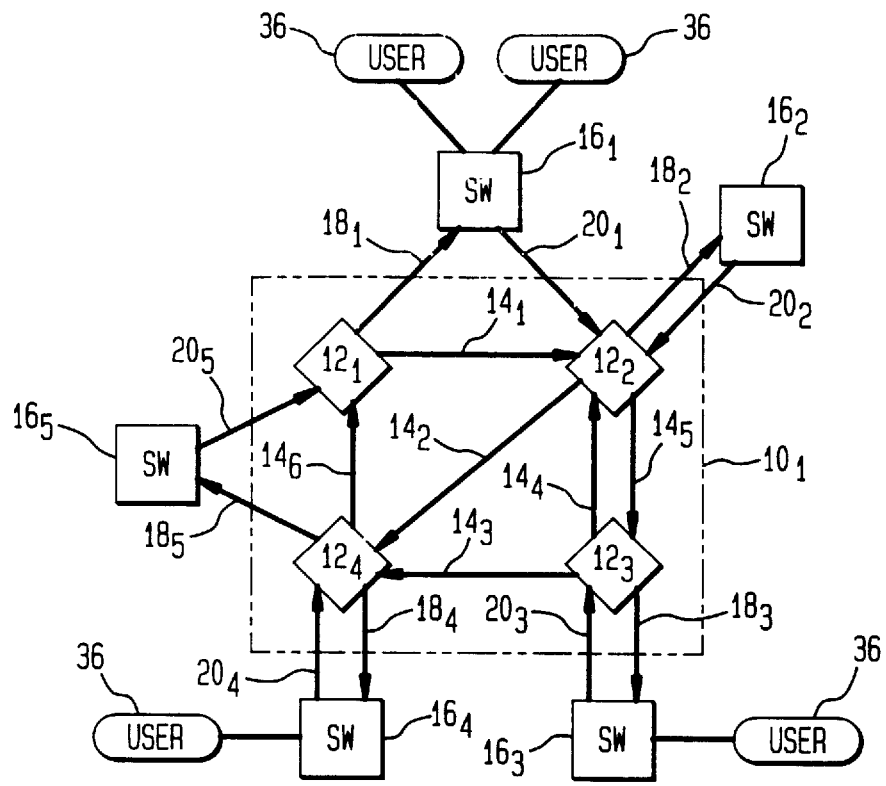
FIG. 1 is a network diagram of an all-optical communication network.
Figure 5:
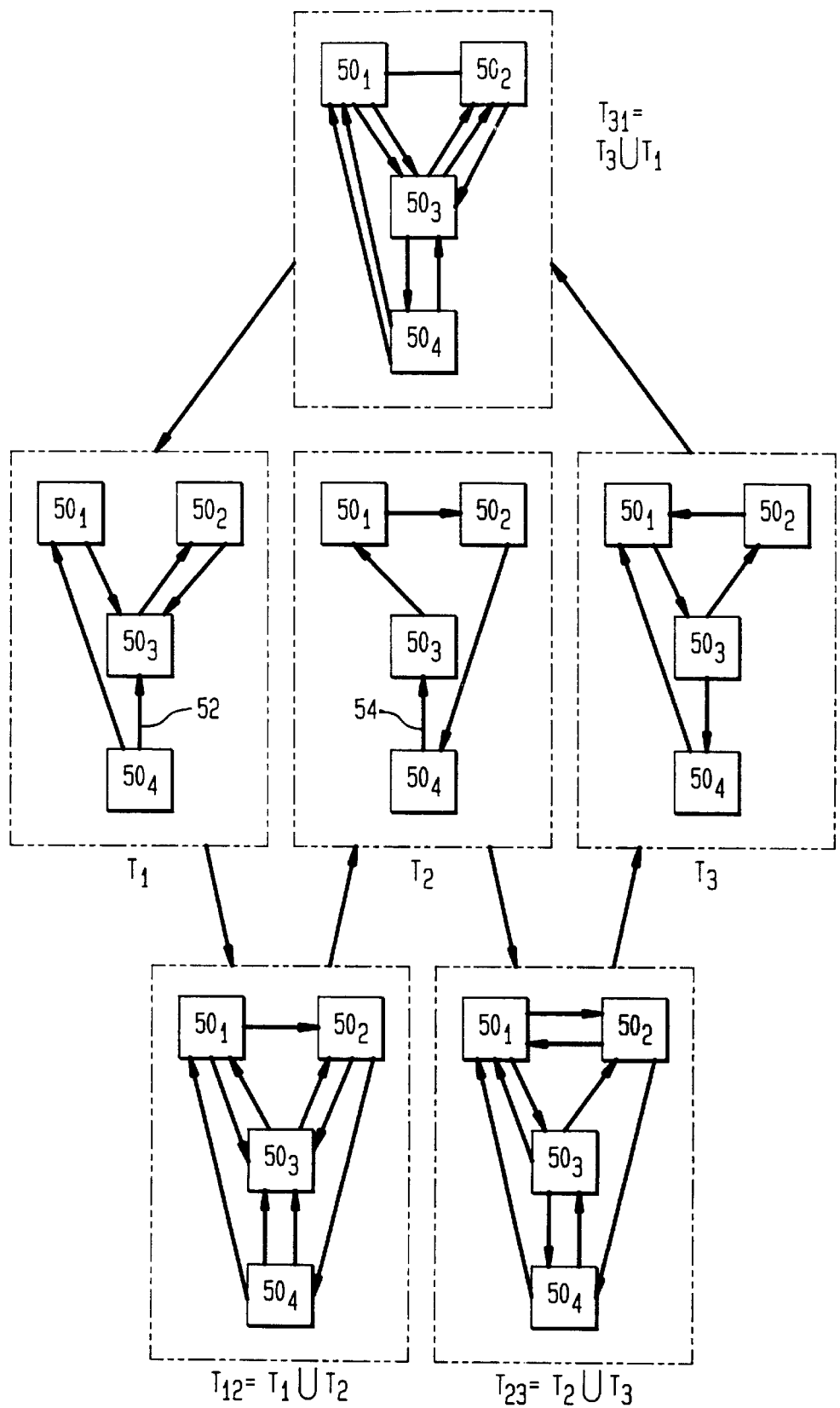
FIG. 5 shows a sequence of configuration topologies, as in FIG. 4, and the transition configurations between them.

The transitions between the three configurations $T_1, T_2, T_3$ of FIG. 4 can be achieved, as illustrated in FIG. 5, by implementing transition configurations $T_{12}, T_{23}$, and $T_{31}$ that include all the WDM channels of the two linked configurations, that is, the union of the two steady-state configurations that the transition configuration links, FIG. 1 $T\_\{i,\sim i+1\}\sim=\sim T\_i\sim union\sim T_{13} \{i+1\}$.

A more mathematically complete description of the problem, especially for a cyclic sequence of N topologies $T_i$ would number those topologies between zero and (N−1), that is, $T_0, T_1, \ldots T_{N-1}$, and the i-th of N unions would be properly defined as FIG. 1 $T\_\{(i-1),\sim i \bmod N\}\sim=\sim T\_\{i-1\}$ union$\sim T\_\{i \bmod N\}\sim$, where mod is the modulus function, denoting the remainder of, for example, i being divided by N. These definitions remove any ambiguity at the transition between cycles. However, this formalism will be dispensed with in the remaining discussion.

An example of a transition according to the invention will now be presented. The transition from $T_1$ to $T_2$ is achieved by first allocating all the links required by $T_2$ on the WDM layer without removing the links previously used in $T_1$. Thus, the links from the union of both topologies $T_1, T_2$ are simultaneously supported. However, the previous steady-state links of $T_1$ are disabled in the sense that no new traffic is allocated to them, and all new traffic is assigned to the links of $T_2$. However, the traffic previously allocated to the $T_1$ links continue to be carried by them until that traffic terminates. As the ongoing calls completely vacate the previously allocated links, those vacated links are removed from service within the active network to gradually achieve a hitless transition to the new configuration. In the event that a call endures through the subsequent configuration period (or past a predetermined deadline) and continues to occupy a link not used in the new configuration, the ATM layer is used to reroute that call onto the links of $T_2$ using a virtual path or virtual circuit reassignment in which wavelength translation may be required by the ATM switching node. Of course, this introduces a hit in the broad sense, but the number of hits will be greatly reduced over the conventional network reconfiguration.

For allocation of WDM channels, a link may be defined in at least two different ways. The allocations illustrated in FIG. 5 assume a definition that allows two links sequentially arranged in two allocation periods to have different WDM wavelengths. That is, the two links are not equivalent so that the union of the two links consists of two links. For example, in $T_1$ a link 52 connects switching nodes $50_3$, $50_4$ while in $T_2$ a link 54 connects those same nodes $50_3$, $50_4$. As a result, both links 52, 54 are present in the transition topology $T_{12}$. This definition of link allows the WDM allocation of each steady-state topology to be optimized as to wavelength and WDM cross-connects $12_1$, $12_2$, $12_3$, $12_4$ within the constraints of the wavelength assignments of the previous steady-state topology. This definition also is consistent with links have additional differentiating characteristics, such as SONET level, which may change during the day even between the same two switching nodes.

Another definition for link, not used in the described embodiments but included within the invention, assumes that links in successive allocation periods linking the same switching nodes are equivalent so that the union of two links between the same nodes consists of only one link.

Algorithms are available in the literature for achieving wavelength routing and assignment within an optical network. See, for example: Ramaswami et al,"Routing and wavelength assignment in all-optical networks," *IEEE/ACM Transactions on Networking*, vol. 3, 1993, pp. 489–500; Lee et al.,"A wavelength convertible optical network," *IEEE/OSA Journal of Lightwave Technology*, vol. 11, 1993, pp. 962–970; Bala et al., "Routing in a Linear Lightwave Network," *IEEE/ACM Transactions on Networking*, vol. 3, no. 4, 1995, pp. 459–469; Bala et al.,"Optical Wavelength Routing, Translation, and Packet/Cell Switched Networks," *Journal of Lightwave Technology*, vol. 14, no. 3, 1996, pp. 336–343.

Figure 2:
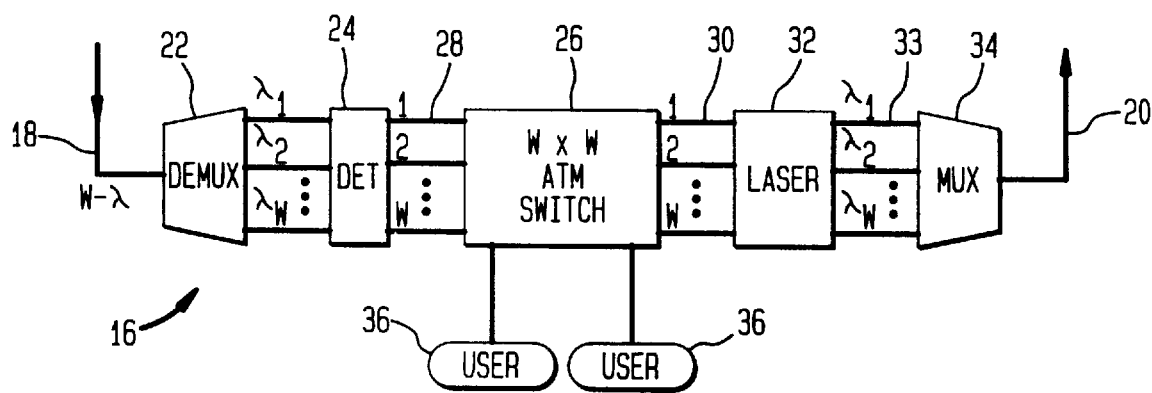
FIG. 2 is a circuit diagram of an electronic switch usable with the network of FIG. 1.
Figure 3:
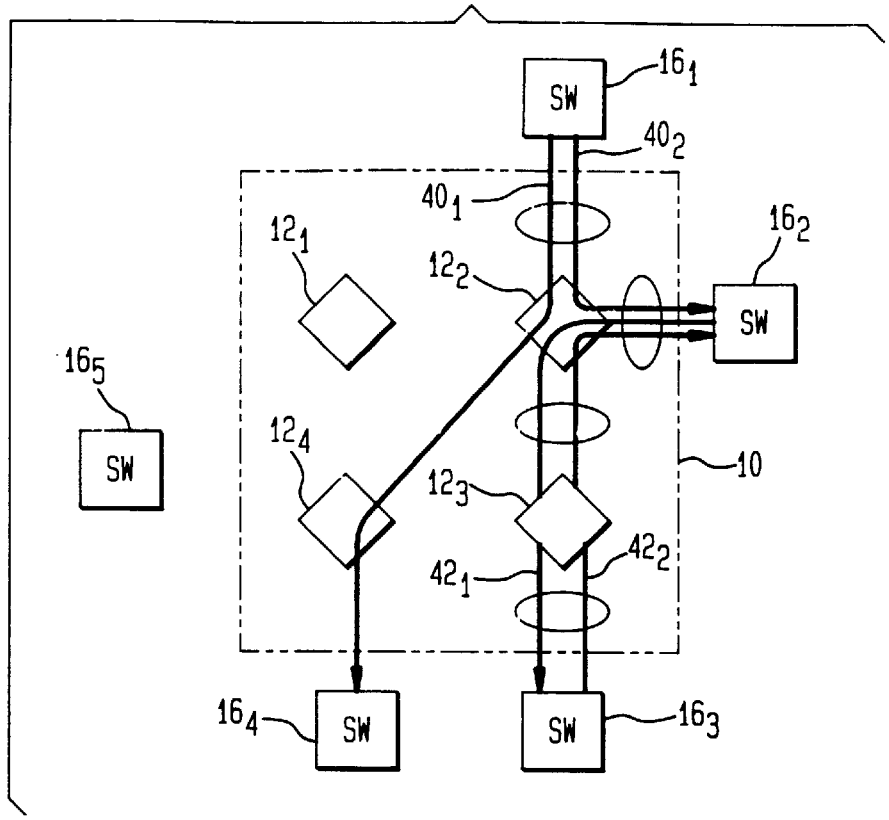
FIG. 3 is a network diagram of wavelength-division multiplexed (WDM) channels between terminal nodes.

The portion of the problem related to wavelength assignment can be rigorously handled if the problem is rearranged into a different form. Wavelength assignment throughout the all-optical network amounts to assigning the data link to a given output of the switch 26 or laser array 32 of FIG. 2 because that output determines the wavelength $\lambda_i$ of the signal on the all-optical network. This statement of the problem assumes that the optical network is non-blocking. That is, any wavelength assignments made at the edge of the network at the ATM switches will not introduce color clash at any point in the network as those signals propagate from the transmitting ATM switch to the receiving one. Colors may be used for multiple signals, that is, reused within the all-optical network, but the configurations of the optical switching units is such as to prevent color clash on any link. Phrased alternatively, wavelengths need to be assigned only to the data ports of the ATM-level switches. This discussion will assume that each switching node has only one fiber pair carrying all the WDM channels for access to and from the all-optical network.

Figure 6:
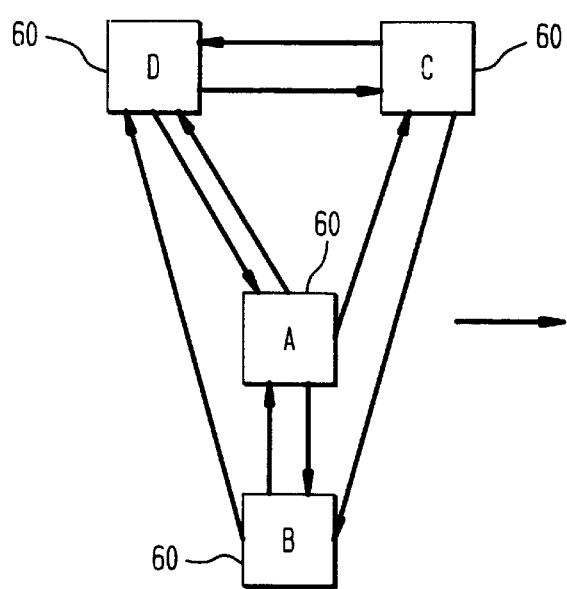
FIGS. 6 and 7 are illustrative block diagrams of a the devolution of a network topology to a bipartite graph.

Consider the desired topology $T_i$ for a network shown in FIG. 6 in which the illustrated links are intended to interconnect four switching nodes 60, designated respectively as A, B, C, D. This aspect of the invention provides a method of assigning the wavelengths of those links. The assignment of the wavelengths must assure that no two outgoing links at any switching node 60 are assigned the same wavelength and no two incoming links at any switching node 60 are assigned the same wavelength. This requirement is often called the color clash constraint. This problem can be reduced to the well known problem of bipartite edge coloring using the following construction.

Figure 7:
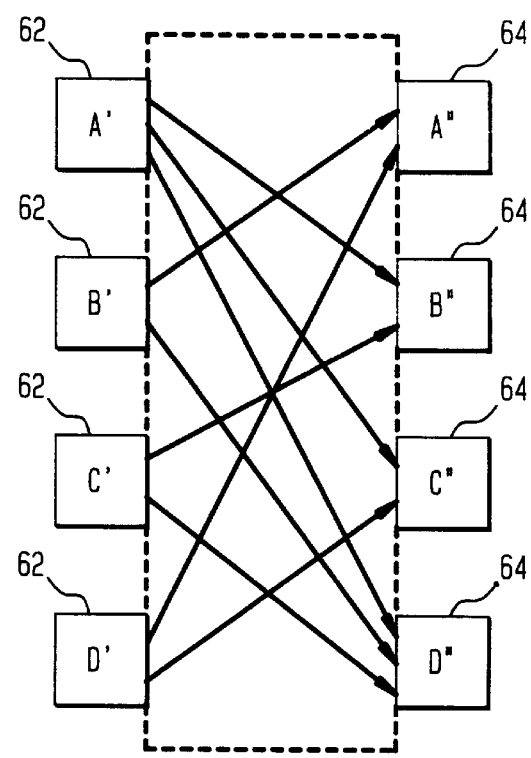

The network of FIG. 6 can be reconstructed as an equivalent two-sided network shown in FIG. 7 that comprises the same links interconnecting four transmitting nodes 62 to four receiving nodes 64. The transmitting nodes 62 are respectively designated A', B', C', D' while the four receiving nodes 64 are designated A", B", C", D". The two-sided network is seen to form a bipartite graph having nodes or vertices connected by edges in which the edges only connect nodes of two different classes. That is, the transmitting nodes on the left are not interconnected, and the receiving nodes on the right are not interconnected. It is noted that the direction of the edge illustrated in FIG. 7 does not enter into these definitions.

The wavelength assignment problem reduces to the coloring problem in finding and assigning the minimum number of colors to all the edges such that no two edges of the same color are incident either on a transmitting node A', B', C', D' or on a receiving node A", B", C", D". This concept is sometimes referred to as finding the maximum matchings for the nodes in which no two edges within a matching can touch the same node.

The nomenclature of graph theory will be imposed upon the network problem. Let V represent the set of the ATM transmitting and receiving node set 60.

FIG. 1 $V = \{u\_1, u\_2, \ldots u\_M\}$.

Let $E_i$ be the set of the links interconnecting the ATM nodes 62, 64 for the i-th network topology $T_i$ FIG. 1 $E\_i = \{e\_1, e\_2, \ldots e\_\{m\_i\}\}$, where $m_i$ is the number of links required in the i-th topology. Then, the network topology can be represented by the graph FIG. 1 $T\_i = G$ left $(V, \sim E\_i$ right$) \sim$.

Algorithms exist for bipartite edge coloring, e.g., Papadimitriou et al., *Combinatorial Optimization: Algorithms and Complexity*, (Prentice Hall, 1982), pp. 218–224, 247–255. However, these algorithms are based upon a fresh coloring of a graph. While the process would work with coloring the union topology $T_{j,i+1}$, the coloring would likely result in some new colors (wavelengths) being assigned to existing connections. The necessity for recoloring of existing connections becomes more apparent if two transitions are considered. The union coloring of the first transition determines the colors of the intermediate configuration which are likely inconsistent with the union coloring of the second transition. To effect the new set of wavelength assignments of the prior configuration would possibly require an immediate reconnection for an old connection, that is, a hit. It is desired to avoid such a hit.

Several algorithms will be presented for assigning wavelengths in a hitless manner. A fundamental distinction is between dynamic and static assignment. In a dynamic assignment, the coloring of the topology $T_i$ is performed afresh every time the topology $T_i$ is encountered. In a cyclic sequence, this may result in different wavelengths being assigned to the same topology $T_i$ on iterative passes through the sequence. On the other hand, in a static assignment, the coloring is performed such that on iterative passes through the sequence, the wavelength assignments remain the same. As a result, it is possible to perform the assignments for the cycle only once and to store them for later retrieval in each of the cycles. Both the presented algorithms are greedy algorithms in their need for additional wavelengths, perhaps over the minimal number.

A first dynamic algorithm will be referred to as the greedy algorithm. As an example, consider the transition from $T_0$ to $T_1$, where $T_0$ requires W wavelengths $(\lambda_1, \lambda_2, \ldots \lambda_W)$. The $T_0$ wavelength allocations are stored in a file. The greedy algorithm considers each required link or edge $e_i$ in $T_1$ and tries to allocate to iFIG. 1 LAMBDA~=~{lambda__1, lambda__2, ... lambda__W\}, starting from $\lambda_1$, but the algorithm checks for color clash, that is, whether that wavelength is being used by either $T_0$ or $T_1$ at either the transmitting or receiving node of the intended link $e_i$. If $\lambda_1$ fails the color clash test, the algorithm attempts the next wavelength $\lambda_2$, et seq. The process is continued until a wavelength $\lambda_i$ is found which does not fail the color clash test, and that wavelength is allocated to that edge $e_j$. If none of the W wavelengths $\lambda_i$ satisfies the color clash constraint, a new wavelength $\lambda_{w+1}$ is created and added to the wavelength set. The wavelength allocations for all links or edges $e_i$ are stored in a file for use on the next transition.

The allocation process is repeated for each new topology $T_i$ and its associated transition. In the dynamic algorithm, the allocation process continues as the topologies are repeated. That is, for the transition from $T_{N-1}$ to $T_0$, a new wavelength allocation is calculated for $T_0$, and this new allocation may be different from the one assigned on the first iteration. Thus, the wavelength allocations on subsequent iterations of the daily reconfiguration of the WDM network are likely to be different.

Figure 8:
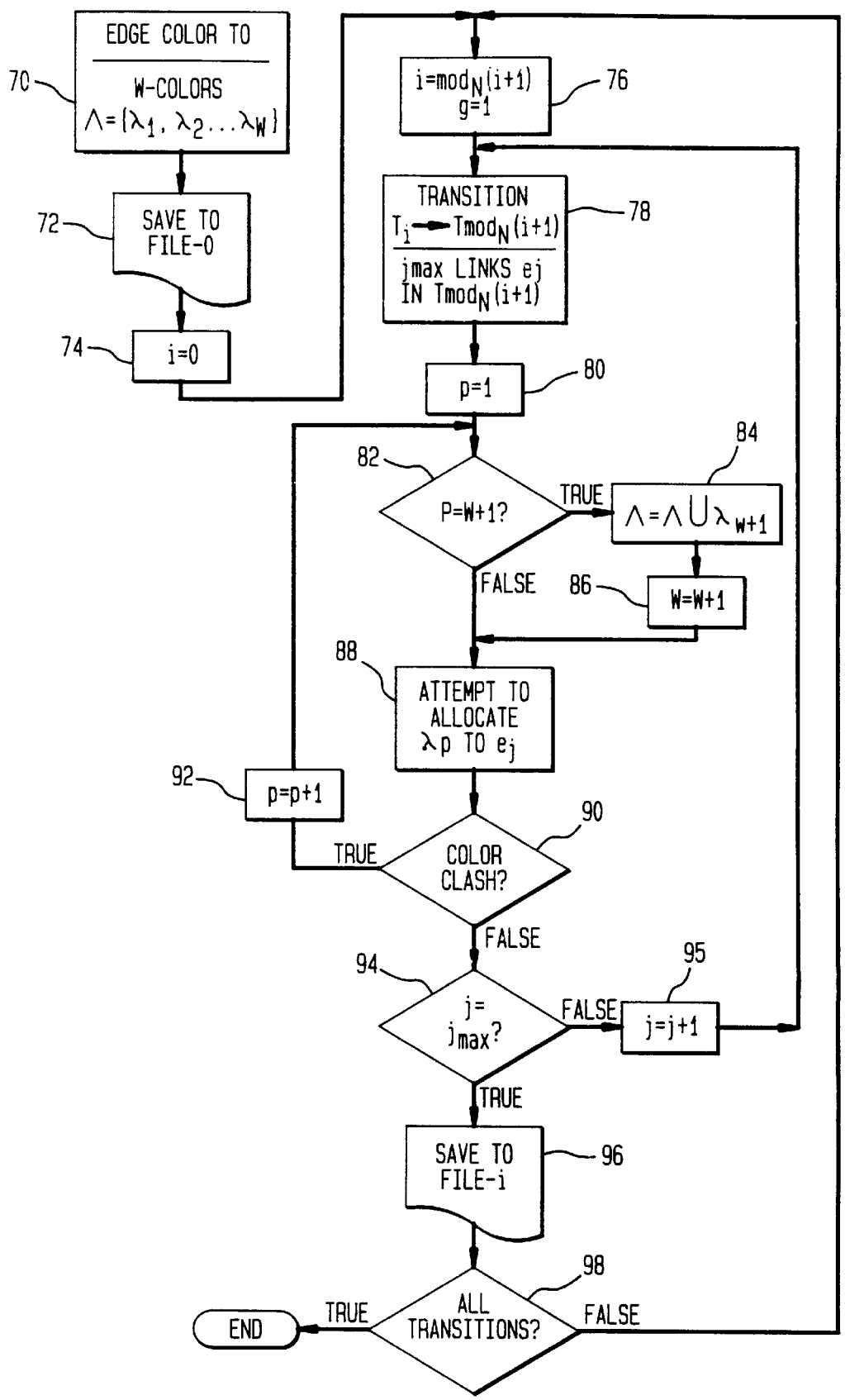
FIG. 8 is a flow diagram of a dynamic greedy allocation algorithm.

An example of a detailed dynamic allocation algorithm is illustrated in the flow chart of FIG. 8. In an initial wavelength allocation step, wavelengths are assigned to the initial network topology $T_0$ by any of several well known edge coloring algorithms. The edge coloring results in the minimum number w of colors or wavelengths $\lambda_p$ in the set FIG. 1 LAMBDA~=~left\{lambda__1, lambda__2, ... lambda__w right \}. This set $\Lambda$ of wavelength allocations is then written in step 72 into a computer file FILE-0 for use with later allocations.

In a initialization step 74, a topology counter i is initialized to zero. Thereafter, the algorithm enters the transition loop. In step 76, a new transition counter is calculated according to the equation $i$~=~mod__$N(i+1)$~, where the modular function represents the remainder of dividing (i+1) by N, and N is the number of topologies in the repeating loop. The modular arithmetic is required to account for the iterations and to provide for the transition between iterations. In this step of the iteration, as shown in the block 78, the wavelengths are to be allocated for the transition from the topology $T_i$ to $T_{(i+1)mod\ N}$. New wavelengths need to be assigned for the links (or edges $e_j$) in the new topology $T_{(i+1)mod\ N}$, of which there are $j_{max}$ links. It will be assumed that the links are processed in the order from 1 to $j_{max}$, but some other order is equally valid. In step 76, the j counter is initialized to 1.

The algorithm then enters the link loop, for every iteration of which a wavelength is assigned to another one of the newly required links. It does not strictly matter in which order the links are allocated wavelengths.

After step 80 in which a wavelength counter p is initialized to one, the algorithm then enters the wavelength loop. In test 82, it is determined if all w wavelengths in the set $\Lambda$ have been already been used up. This can be determined by testing whether p equals w+1. If all existing wavelengths have been used, in step 84, a new wavelength $\lambda_{w+1}$, which increases the wavelength set according to
FIG. 1 LAMBDA~=~LAMBDA~∪~lambda__{w+1}.

Also, in step 86, the number w is increased by one.

In step 88, an attempt is made to allocate the wavelength $\lambda_p$ to the link or edge $e_j$. But, in test 90, it is immediately tested whether there is color clash with this tentative assignment. The test for color clash must account for the network architecture and the configuration of optical switching units to determine what are links through the all-optical network. The tentative assignment must be tested against both whether the wavelength $\lambda_p$ is already being used in the prior topology $T_i$ and whether is has already been allocated to another link (edge) in the new topology $T_{(i+1)mod\ N}$. The wavelength allocation table FILE-0 is read from the computer file to determine the wavelength allocation in the prior topology $T_i$. If there is a color clash, in step 92, the wavelength counter p is incremented, and another wavelength is tried.

If there is no color clash, the attempted wavelength allocation has been successful, and then a test 94 is made to determine if any more links (edges) need to have a wavelength (color) assigned to them, that is, whether $j=j_{max}$. If one or more uncolored links remain, in step 95 the j counter is incremented and the link loop is executed again for another link (edge).

If all the links have had wavelengths assigned to them, then the wavelength allocation for the new topology T(i+1) mod N has been completed. The wavelength allocations are written in step 96 into a computer table FILE-i. Note that due to the modular arithmetic only N such wavelength allocation tables need be calculated, one for each of the topologies $T_i$. The number of computer tables FILE-i can be significantly reduced if desired. The dynamic algorithm requires only one for the previous allocation. The static algorithm requires both the previous allocation and the new allocation; but, advantageously all allocations are stored in separate files in the static case so that the allocations need be calculated only once.

A test 98 can then be made to determine if all the transitions have had their new wavelengths allocated. If more transitions remain, then the transition loop is again executed. Note, however, that in view of the iterative nature of the transitions, it is anticipated that many more than N transitions would be processed by the algorithm. The test 98 could be eliminated, and the transition loop would then continually recycle until some sort of interrupt would require a reinitialization of the dynamic algorithm.

Figure 9:
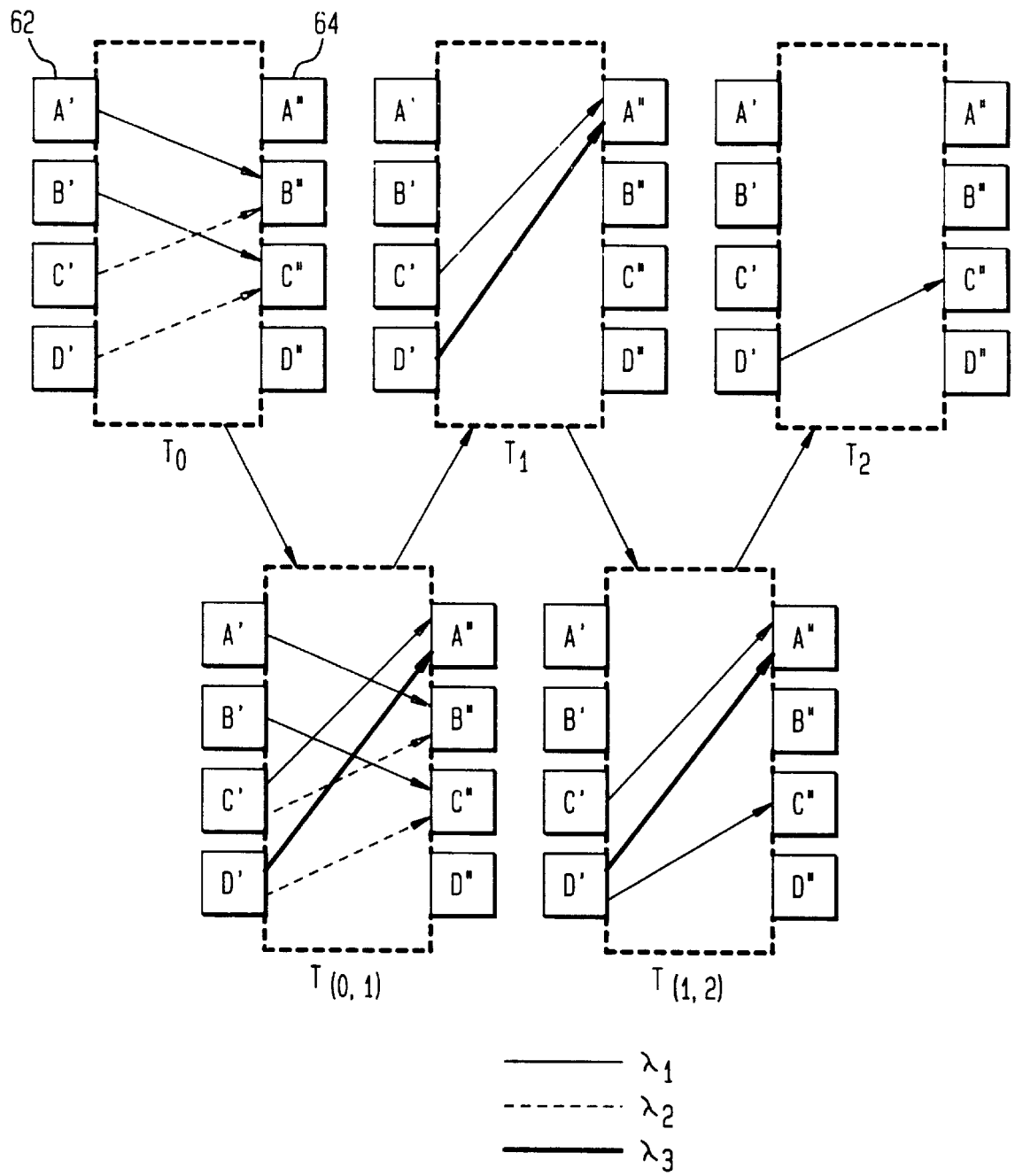
FIG. 9 is a schematic diagram of an exemplary wavelength allocation according to the dynamic greedy allocation algorithm of FIG. 8.

An example of the sequence of wavelength allocations performed by the dynamic algorithm is represented in FIG. 9, where the represented links are determined by a traffic optimization process not directly relevant to this invention. The wavelength allocations for the initial topology $T_0$ is performed by a separate edge color algorithm that results in the minimal number of wavelengths, that is, two wavelengths $\lambda_1, \lambda_2$. The dynamic algorithm determines that, in order to avoid color clash, the next topology $T_1$ requires two wavelengths, but a different set $\lambda_1, \lambda_3$ than the initial set $\lambda_1, \lambda_2$. The three wavelengths allow the union topology $T_{0,1}$ to operate without inter-channel interference (color clash). The last illustrated topology $T_2$ requires only a single wavelength, determined by the dynamic algorithm to be $\lambda_1$.

Assuming that only the three topologies $T_0, T_1, T_2$ are included in the iteration, the dynamic allocation algorithm then allocates a new set of wavelength allocations for the initial topology $T_0$. However, if the links are processed in the order (A'B", B'C", C'B", D'C"), the algorithm assigns $\lambda_1$ to A'B", but then assigns $\lambda_2$ to B'C" in order to avoid a color clash with the prior topology $T_2$. The second wavelength $\lambda_2$ is also assigned to C'B" since there is no conflict, but the third wavelength $\lambda_3$ is required for the last link D'C" in $T_0$. As a result, not only does the wavelength allocation to $T_0$ in the second iteration differ from that in the first iteration, but an additional wavelength is required for the initial topology $T_0$.

The dynamic allocation algorithm has been coded and applied to a number of random cases. We also have established upper and lower bounds for the number of wavelengths required for a hitless reconfiguration of one arbitrary topology to another. The dynamic algorithm seems to perform relatively well, requiring a number of wavelengths that is much closer to the theoretically established lower bound than to the upper bound.

Nonetheless, the open-ended nature of the dynamic allocation algorithm in assigning new wavelengths is discomforting. It is desired to establish a fixed wavelength assignment that does not vary from iteration to iteration. That is, every time the network returns to the topology $T_i$ in a fixed repeating sequence of such topologies, the same set of wavelengths are allocated to $T_i$. That is, the wavelength assignments once determined for a topology are static over repeated iterations. The repeating allocations need be calculated only once with the results stored in tables to be used whenever the particular topology and associated transition are encountered. However, for fixed wavelength assignment, the last transition from $T_{N-2}$ to $T_{N-1}$ presents problems because the wavelength allocation to $T_{N-1}$ might present a color clash with $T_0$ when the sequence wraps around.

This problem can be avoided if the greedy algorithm is modified such that the wavelength allocations to the final topology $T_{N-1}$ are required to color clash with neither the preceding topology $T_{N-2}$ nor the following topology $T_0$.

Figure 10:
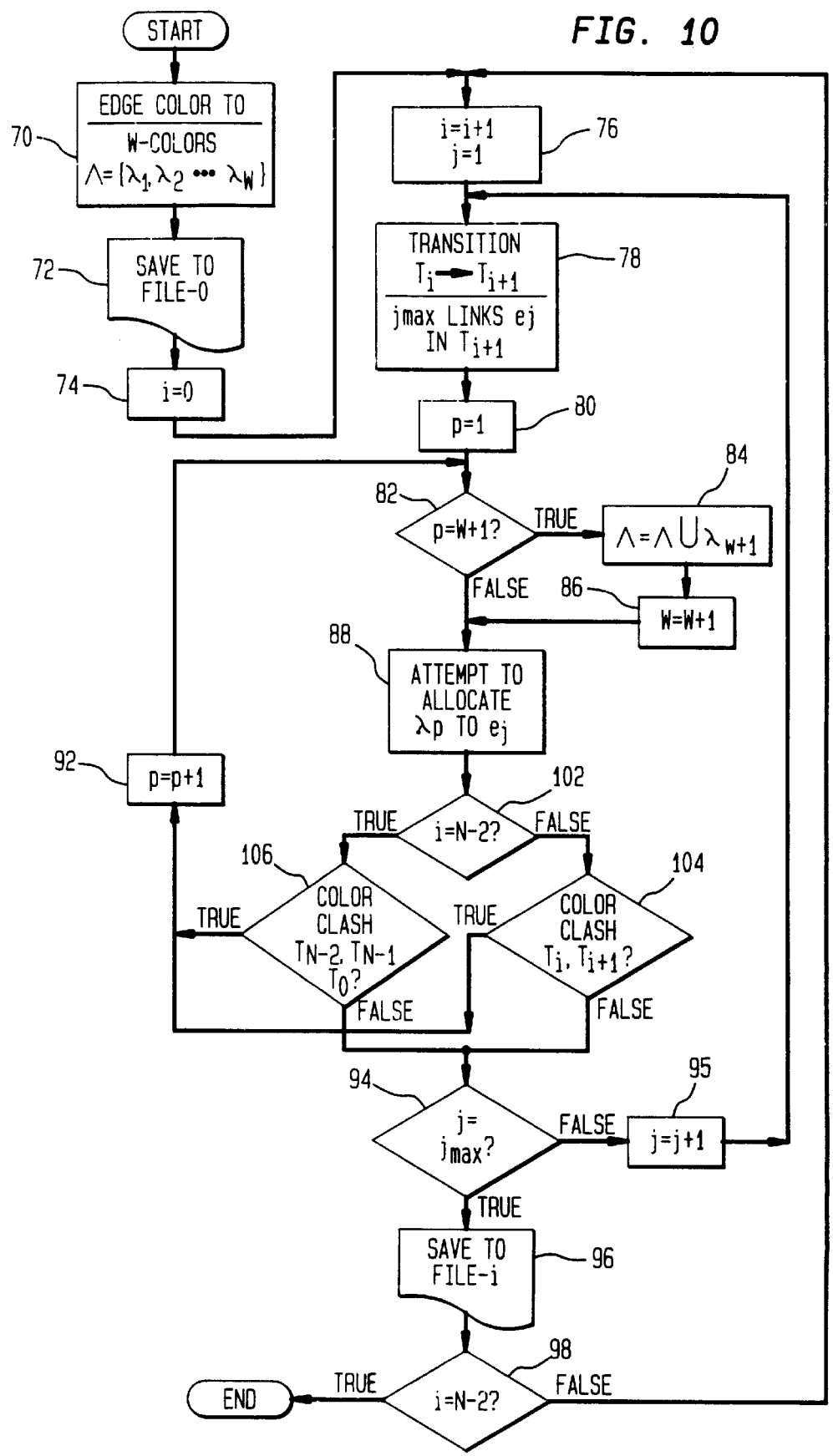
FIG. 10 is a flow diagram of a static greedy allocation algorithm.

An example of the static greedy algorithm is illustrated in the flow diagram of FIG. 10. It mostly follows the dynamic algorithm of FIG. 8 although the modular arithmetic is no longer necessary. However, the dynamic color clash test 90 changes to a more complex procedure. Instead, in a transition test 102, it is determined if i=N−2, that is, whether this is the last transition in the cycle in which the new topology is $T_{N-1}$. If it is not, in a two-state color test 104, a standard test is made between the old and new topologies $T_i$, $T_{i+1}$. If there is a color clash, color loop is reentered through step 92 incrementing for a new color. If there is no color clash, the color loop is exited to the link test 94. However, if the transition test 102 shows that the last topology $T_{N-1}$ is being allocated, then in a three-state color test 106 color clash is checked between the last two topologies $T_{N-2}$, $T_{N-1}$ as well as the first topology $T_0$. If there is color clash, the color loop is reentered through step 92; if there is no color clash, the color loop is exited through the link test 94. In either case of exiting the color loop through tests 104, 106 the color allocation has been successful because there is no color clash.

Execution then returns to the flow of FIG. 8. The test 98 to exit the transition loop and thereafter terminate the algorithm compares the transition counter i against N−2 since the static algorithm needs to cycle only once through the transitions with the wavelength allocations being stored in the respective tables FILE-i.

Figure 11:
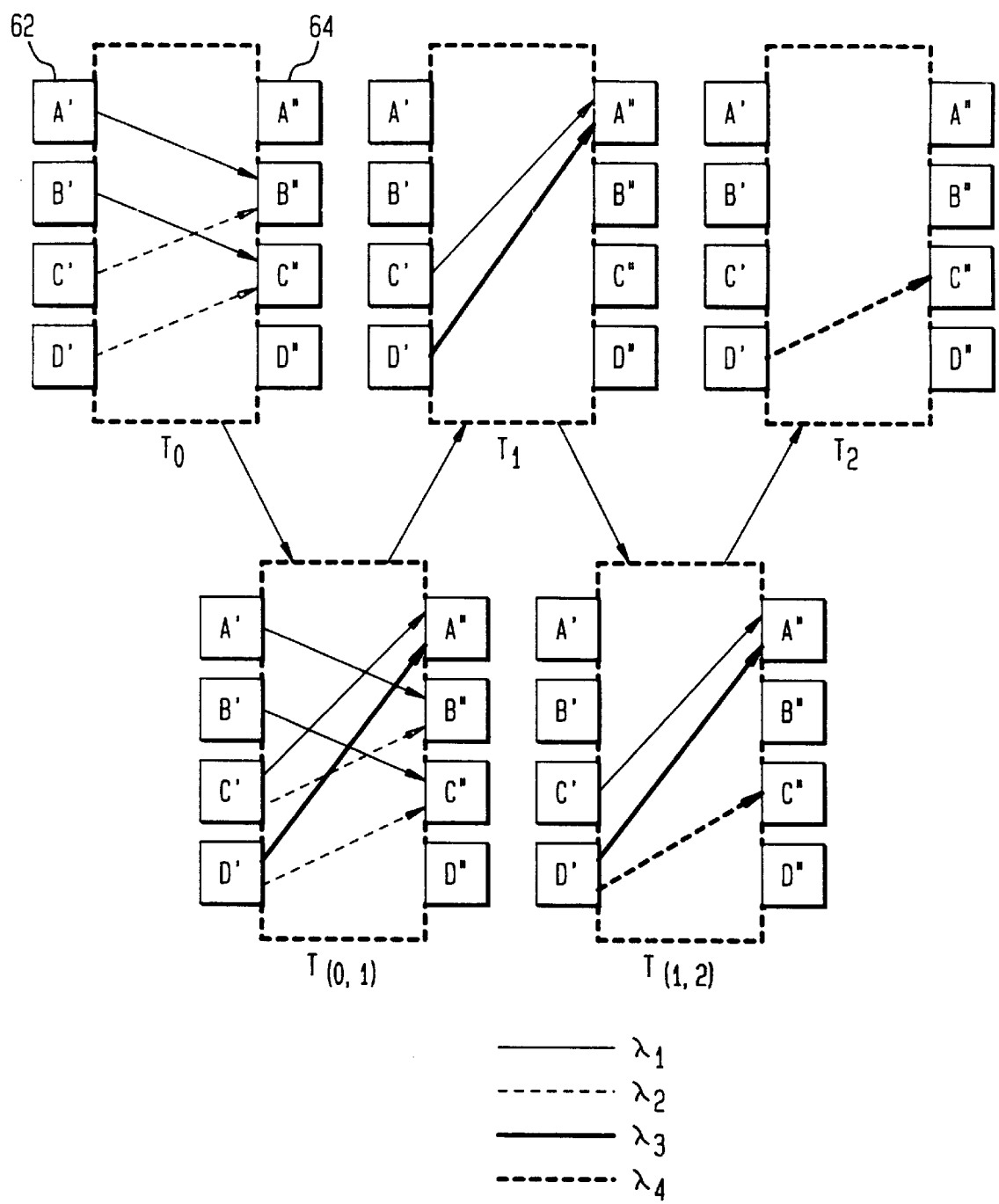
FIG. 11 is a schematic diagram of an exemplary wavelength allocation according to the static greedy allocation algorithm of FIG. 10.

An example of the results of the wavelength allocation by the static greedy algorithm is shown in FIG. 11. The illustrated topologies $T_0$, $T_1$, $T_2$ are the same as in FIG. 9. As a result, the wavelength allocations in the first two topologies $T_0$, $T_1$ do not differ between the dynamic and static algorithms since the two algorithms work essentially the same in this region. However, when the static algorithm in preparing for the transition between $T_1$ and $T_2$ determines the wavelength allocation for the last topology $T_2$ in the iteration, it must also check for color clash against the initial topology $T_0$. Where the dynamic algorithm selected the first wavelength $\lambda_1$ for the link D'C", the static algorithm determines $\lambda_1$ causes a color clash with $T_0$. It then determines that the remaining wavelengths $\lambda_2$, $\lambda_3$ cause color clashes with $T_0$, $T_1$ respectively. It thus is required to select a new wavelength $\lambda_4$ for the sole link in $T_2$. Thereby, there is no color clash between any of $T_1$, $T_2$, $T_0$.

On subsequent iterations of the transition loop, the illustrated wavelength allocations are repeated. In the examples, at least as far as they were simulated, the static algorithm required one more wavelength than does the dynamic algorithm. However, we are assured that the static algorithm will never require additional wavelengths while, for the dynamic algorithm, particularly for more complex sets of topologies, we do not have this assurance.

Figure 12:
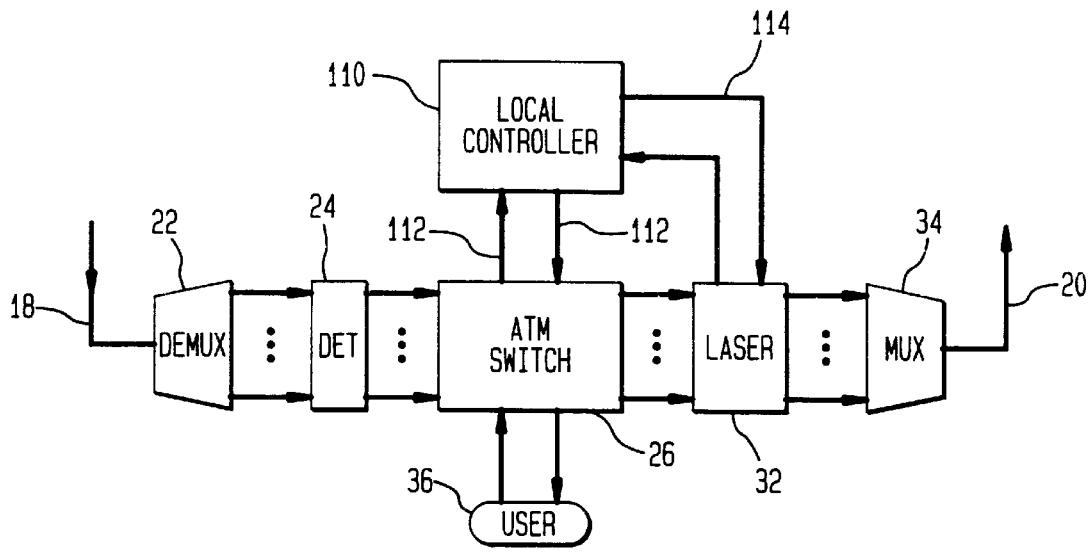
FIG. 12 is a schematic representation of the local control of an ATM switch and its peripheral equipment in a WDM network.

The discussion about the control of the network configuration has so far not touched directly on the apparatus exercising that control. As illustrated in the circuit diagram of FIG. 12, a local controller 110 is associated with each ATM switch 26. The local controller 110 may be a personal computer (PC) or a workstation or other type of logic device which has been properly programmed to maintain the overall configuration of the ATM switch 26. The software controller 110 is connected to the ATM switch 26 by electrical lines 112 used for higher-level control signals, the lower level control being integrated into the ATM. The local controller 110 determines which output ports of the ATM switch 26 are assigned to particular wavelengths of the laser array 32 and also turns on the necessary lasers as required through control and monitoring lines 114.

Figure 13:
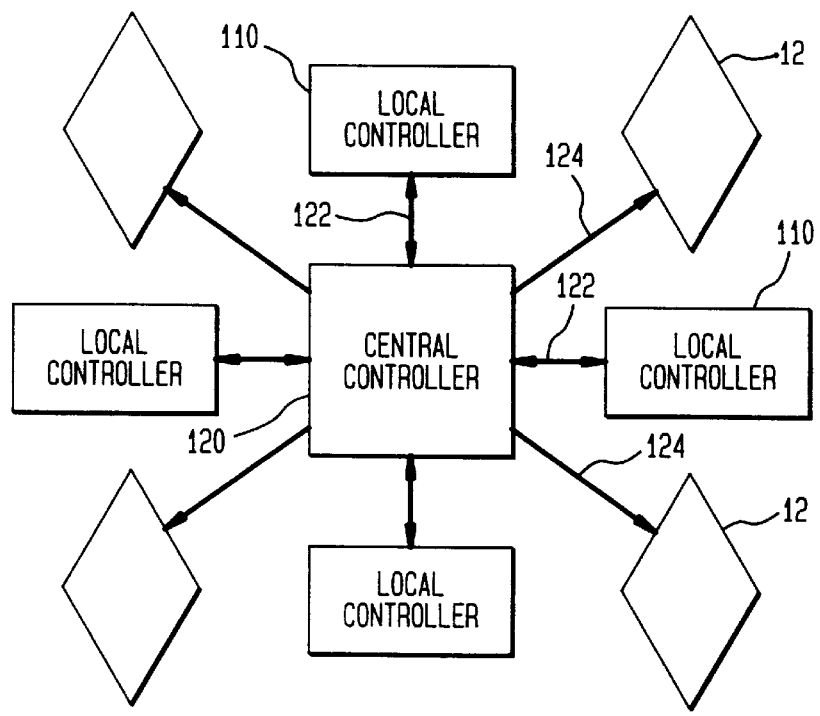
FIG. 13 is a schematic representation of the distributed network control of the WDM network.

A control configuration is schematically illustrated in FIG. 13. All the local controllers 110 and the WDM switching nodes 12 within the network communicate with and are in some sense controlled by a central controller 120, which may be one or more separate computers or may be physically incorporated into the hardware of one or more of the local controllers 110. ATM control paths 122 carry control information between the local and central controllers 110, 120, and network control paths 124 carry control information from the central controller 120 to the switching nodes 12 to determine their wavelength switching configurations. Much flexibility exists as to the nature of the control paths 122, 124 and the nature of the central controller 120.

The control paths 122, 124 may be overhead bits or slots in the ATM or SONET level in what is called an embedded system, or they may be an overlaid network, much like the present SS7 system for controlling the telephone network from outside the communication channels being controlled. In either case, it is preferred that the same optical fibers used in the communication network be used for the control information or control network.

The central controller 120 may be a separate workstation interconnected to the communication network either through one of the local software controllers 110 or by its own connections to a ATM switch 26 or by separate access means to the fiber network. To assure robustness of the network in the face of local problems, it is preferred that the central software controller 120 be distributed throughout the communication network with information being replicated at the nodes as required to assure that failure of one node does not bring down the rest of the network.

An example of the process of performing the hitless algorithm within an extended network is now presented. At a certain time determined by a reconfiguration schedule, the central controller 120 determines that a transition will occur from a first configuration to a second configuration. As an example ATM switch is to be connected to the third ATM switch. The central controller 120 notifies the local controllers 110 at the first and third ATM switches that a connection 1–3 has to be made, and the local controllers 110 in turn execute the desired version of the hitless algorithm to determine which wavelength to assign to the new connection. Alternatively, the central controller 120 could execute the hitless algorithm and then broadcast the results as required to the local controllers 110.

Assume that the i-th wavelength $\lambda_i$ is chosen for the 1–3 connection. The local software controller 110 at the first ATM switch tells its associated ATM switch 26 to use its i-th output port for the new connection and also instructs the laser array 32 to turn on the i-th laser. Also, the controller 110 at the third ATM switch instructs the electronic ATM switch 26 to listen at its i-th input port for the new connection. The central controller 120 also issues commands to the nodes 12 to configure their wavelength switching so as to route the wavelength $\lambda_i$ from the first to the third ATM switch in conformity with the new configuration.

When an originating ATM finishes the last call connection on an expiring link, its local controller performs the inverse operation of disconnecting that link with a notification through the central controller to the network and to the terminating ATM. The invention is not limited to the described embodiments, especially in combination. Other allocation algorithms can be used in conjunction with the inventive feature of a temporary transition topology of the union of the two topologies between which the transition is being made. Also, other definitions of union of two topologies may be used. For example, if both of the topologies being transitioned require one or more of the same links, irrespective of wavelength, it is possible for at least some of these non-changing links to assign the same wavelengths to the links in both topologies. That is, the former link is not eventually phased out.

The invention thus provides a number of several advantages in reconfiguring a multi-wavelength network without interrupting existing connections. The invention provides the insight that a well known mathematical graphing theory and its many results can be applied to the problem of a hitless reconfiguration. The invention also provides a simple procedure for transitioning from one network topology to another. Finally, the invention can be implemented with two simple wavelength allocation algorithms that have been shown to require not significantly more wavelengths than the theoretical limit. That is, more complex allocation algorithms produce only marginally better results.

What is claimed is:

1. A method of reconfiguring a wavelength-division multiplexed communication network comprising a plurality of nodes linked by a plurality of optical channels each carrying a plurality of optical signals at different respective optical wavelengths, said method comprising the steps of:
   a first step of determining a first wavelength allocation for a first configuration of said network;
   a second step of determining a second wavelength allocation for a second configuration of said network that does not conflict with said first wavelength allocation; and
   at a beginning of a transition from said first configuration to said second configuration assigning all new connections according to said second wavelength allocation.

2. The method of claim 1, further comprising, for a time less than that till a transition from said second configuration to a subsequent third configuration, allowing existing connections according to said first wavelength allocation to continue.

3. The method of claim 2, wherein said allowing step removes each one of said existing connections as a last call on said each one existing connection terminates.

4. The method of claim 3, wherein said allowing step assigns a virtual circuit to any existing connections not removed at the end of said time.

5. The method of claim 1:
   wherein said network includes a plurality of switching nodes, each comprising
      an optical demultiplexer and detector array receiving one of said optical channel from said network and providing a plurality of electrical reception signals corresponding to said plurality of said optical signals,
      an electronic switch receiving said electrical outputs from said optical demultiplexer and detector array and selectively switching said electrical reception signals to a plurality of electrical transmission signals, and
      a laser array and optical multiplexer receiving said electrical transmission signals and outputting a plurality of said opelectrical switch.

6. The method of claim 5, wherein said electrical switch is an ATM switch.

7. The method of claim 1, wherein said network is arranged in a plurality of successive and repeating configurations, said determining steps providing wavelength allocations for each of said successive and repeating configurations, wherein said determining steps are performed at each transition between successive configurations.

8. The method of claim 1, wherein said network is arranged in a plurality of successive and repeating configurations, said determining steps providing wavelength allocations for each of said successive configurations, wherein said allocations are same allocations for repetitions of said configurations.

9. The method of claim 1, wherein said second determining step includes for each of a plurality of said optical channels in said second configuration sequentially testing each of a plurality of wavelengths to determine if assigning said each wavelength to said each channel in said second configuration would conflict with said each wavelength in said first configuration.

10. The method of claim 9, wherein said second determining step further includes, if all of said plurality of wavelengths tested in said second determining step conflict with wavelengths allocated in said first determining step, adding a further wavelength to said plurality of wavelengths.

11. A hitless reconfiguration method of transitioning from a first topology of a wavelength-division multiplexed network to a second topology thereof, comprising the steps of:
   forming a union of said first and second topologies, thereby forming a union topology;
   during at least a part of a transition period configuring said network according to said union topology; and
   at the end of said transition period configuring said network according to said second topology.

12. The method of claim 11, wherein said network is an optical network including wavelength-selective switching elements and wherein said configuring of said network includes reconfiguring optical selectivities of said switching elements.

13. A method of allocating optical wavelengths to an optical wavelength in a wavelength-division multiplexed optical communication network, said network having been allocated a first set of wavelengths to first links thereof according to a first topology and a first wavelength allocation thereof and requiring to be allocated a second set of wavelengths to second links thereof according to a second topology, said method comprising allocating such second set of wavelengths that do not clash along common ones of said first and second links.

14. The method of claim 13, further comprising establishing a transition topology between said first and second topologies comprising a union of said first and second topologies.

15. An optical network, comprising:
- an optical fabric including optical fiber and reconfigurable wavelength-selective optical switching elements to form selective optical links across said fabric;
- more than two nodes having electronic switching elements and receiving multi-wavelength optical signals from said fabric and transmitting multi-wavelength optical signals to said fabric; and
- a controller executing an algorithm for controlling said fabric and said nodes including the steps of
   - a first step of determining a first wavelength allocation for a first configuration of said fabric and said nodes,
   - a second step of determining a second wavelength allocation for a second configuration of said fabric and said nodes that does not conflict with said first wavelength allocation, and
   - at a beginning of a transition from said first configuration to said second configuration assigning all new connections according to said second wavelength allocation.

16. The optical network of claim 15, wherein said controller includes local controllers associated with respective ones of said nodes and a central controller controlling said local controllers.

* * * * *